(12) United States Patent
Carlson et al.

(10) Patent No.: US 6,934,657 B1
(45) Date of Patent: Aug. 23, 2005

(54) METHOD, SYSTEM, AND DEVICE FOR GRAPHICALLY PRESENTING WATER TEMPERATURE DATA

(75) Inventors: Michael E. Carlson, Olathe, KS (US); Scott J. Brunk, Overland Park, KS (US); Darrin W. Kabel, Overland Park, KS (US); Thomas H. Walters, Gardner, KS (US)

(73) Assignee: Garmin Ltd., (KY)

( * ) Notice: Subject to any disclaimer, the term of this patent is extended or adjusted under 35 U.S.C. 154(b) by 225 days.

(21) Appl. No.: 10/293,633

(22) Filed: Nov. 13, 2002

(51) Int. Cl.[7] ............................................. G01K 1/00
(52) U.S. Cl. ..................................... 702/130; 181/124
(58) Field of Search ....................... 702/130; 181/124; 340/584, 426.16

(56) References Cited

U.S. PATENT DOCUMENTS 5,675,552 A * 10/1997 Hicks et al. ................ 367/103
6,215,405 B1 * 4/2001 Handley et al. ............ 340/584
6,222,449 B1 * 4/2001 Twining ................. 340/539.11
6,542,077 B2 * 4/2003 Joao ....................... 340/426.16
6,595,315 B1 * 7/2003 Fujimoto et al. ........... 181/124

OTHER PUBLICATIONS

Bell.et al, "Climate assessment for 1997", American Meteorlogical Society, vol. 79, No. 5, May 1998.*

* cited by examiner

Primary Examiner—John Barlow
Assistant Examiner—Xiuqin Sun
(74) Attorney, Agent, or Firm—Devon A. Rolf (57) ABSTRACT

Systems, devices and methods are provided for monitoring water temperature. One method includes receiving water temperature data and graphically presenting the data. The data is presented having the water temperature data graphically differentiated to indicate when the water temperature data crosses a threshold temperature.

40 Claims, 6 Drawing Sheets

METHOD, SYSTEM, AND DEVICE FOR GRAPHICALLY PRESENTING WATER TEMPERATURE DATA

FIELD OF THE INVENTION

The present invention relates generally to marine craft systems and, more particularly to methods, systems, and devices for graphically presenting water temperature data.

BACKGROUND OF THE INVENTION

Electronic devices and systems are playing an ever increasing role on marine craft for the navigation of bodies of water. For instance, the use of Global Positioning System (GPS) technology, to locate a marine craft on a body of water, coupled with electronic navigational maps allows the driver of a marine craft to chart location and course of the craft. Further, such electronic devices can allow the driver to navigate the marine craft by viewing the information displayed on a monitor, contained in a hand held unit, on an instrument display, or in a device such as a fish finder, sounder, chart plotter, or the like.

Additionally, advancements in sonar technology, since its inception in the late 1930's, has enabled marine craft users to identify the depth and the terrain type and structure of the bottom of a body of water as well as objects suspended within the water between the sonar transducer and the bottom of the body of water. More recent refinements in this technology have also seen sonar units decrease in size, allowing for their use on personal marine craft and experienced refinements in the device's ability to view objects. Marine and sport fishing enthusiasts now embrace this technology's ability to identify underwater objects as small as fish, weeds, thermo-clines, and the like. These advancements have allowed users, for example in the field of diving, to find wrecks, bottom features, and animals upon which they would be interested in diving to see, and have been utilized in the field of fishing to identify potential fishing spots for an angler.

Systems that utilize a sonar device can also utilize a temperature sensor to identify the surface temperature and in some instances can identify the temperature in different regions below the surface. The ability to identify the temperature of the water near the marine craft is of particular interest to fisherman, because it is generally known that the temperature of the water in which the fish are located effects their behavior patterns and feeding locations. For example, temperature can play a role in activities such as, feeding and spawning. Temperature can also play a role in nurturing a food supply for the fish and, therefore, an area with a temperature conducive to nurturing the food supply can also have feeding fish. Anglers believe that it is during aggressive periods, such as during feeding and spawning, that a fish will more readily ingest bait presented to it.

Accordingly, many anglers believe that by locating an area within the body of water wherein the temperature of the water is within a specific target temperature range, that they are able to more readily catch fish. Since identifying a location that has a water temperature within a specific temperature range can be a key element in locating fish that are feeding or spawning, the monitoring of temperature can be a key to fishing success.

Temperature sensors have been developed in many forms, for example, sensors have been devised that are attached through the hull of the marine craft or to the transom of the marine craft. These types of devices have generally been capable of measuring the temperature of the water at or near the surface of the body of water. Additionally, sensors have been developed that are lowered to a desired depth wherein the temperature is measured by the sensor. These devices typically have a waterproof temperature sensor unit connected thereto by a long conductive cable. The sensor can then be lowered into the water and the temperature measured at a desired depth.

Temperature information has heretofore been displayed on the monitor of devices and systems such as, for example, fish finders, sounders, plotters, marine craft instrument panels, and the like. The information is sometimes displayed as a running line plot that indicates the temperature either versus time or versus depth. Alternatively, in some applications, the information has been displayed as a numerical measurement of the temperature measured by the sensor, for example, as 69 degrees Fahrenheit or 20 degrees Celsius. However, the display of temperature information in these ways does not allow the user to see trends in the water temperature data or to see the location of the marine craft relative to the edge of the water having the desired temperature range.

Since, in some marine situations it is desirable to remain within, or in proximity to, water having a specific temperature range, audible and visual alarms have been developed to alert the driver of the marine craft that the craft has moved out of an area of water having temperature within the desired range. For example, one prior art device is capable of setting an alarm that sounds an audible alarm when the marine craft is within a preset range of temperatures. Alternatively, the device can also be set such that the audible alarm will sound when the marine craft is outside of the range. However, the use of these alarms does not allow the user to see how quickly they are approaching or leaving an area of desired temperature or to see the location of the marine craft relative to the edge of the water having the desired temperature range.

Prior art devices utilizing visual alarms, have utilized text messages, for example, stating that the marine craft has moved outside the temperature range and have utilized signals such as a flashing light to indicate that the marine craft has gone outside the preferred area. However, the devices are not able to monitor the temperature over a period of time, and therefore are unable to allow the driver to see how quickly he or she is nearing an area having the desired temperature or how quickly the marine craft will be exiting an area exhibiting the desired temperature range at the speed the marine craft is presently moving. Nor do these devices allow the user to know the location of the water having the correct temperature or to define an area by mapping having a desired water temperature. The information is also provided on a screen that is separate from the screen in which the temperature data is being shown and therefore, while the alarm screen is being viewed, the other functions of the device can be obscured.

Thus, there exists a need for marine craft systems, devices, and methods that can provide temperature trends, temperature history, temperature area mapping, unobstructed viewing of alarms and data, and the like.

SUMMARY OF THE INVENTION

The above mentioned problems of navigational devices are addressed by the present invention and will be understood by reading and studying the following specification. Systems, devices, and methods are provided for utilizing temperature data to graphically correlate temperature to other data criteria, such as time and location, for example. The systems, devices, and methods of the present invention improve the user's ability to track water temperature changes and to locate an area exhibiting a preferred temperature range.

One method of the present invention includes receiving water temperature data and graphically presenting the data. The data is presented having the water temperature data graphically differentiated to indicate when the water temperature data crosses a threshold temperature.

These and other embodiments, aspects, advantages, and features of the present invention will be set forth in part in the description which follows, and in part will become apparent to those skilled in the art by reference to the following description of the invention and referenced drawings or by practice of the invention. The aspects, advantages, and features of the invention are realized and attained by means of the instrumentalities, procedures, and combinations particularly pointed out in the appended claims.

DETAILED DESCRIPTION OF THE INVENTION

In the following detailed description of the invention, reference is made to the accompanying drawings which form a part hereof, and in which is shown, by way of illustration, specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense, and the scope of the present invention is defined only by the appended claims, along with the full scope of equivalents to which such claims are entitled.

Figure 1:
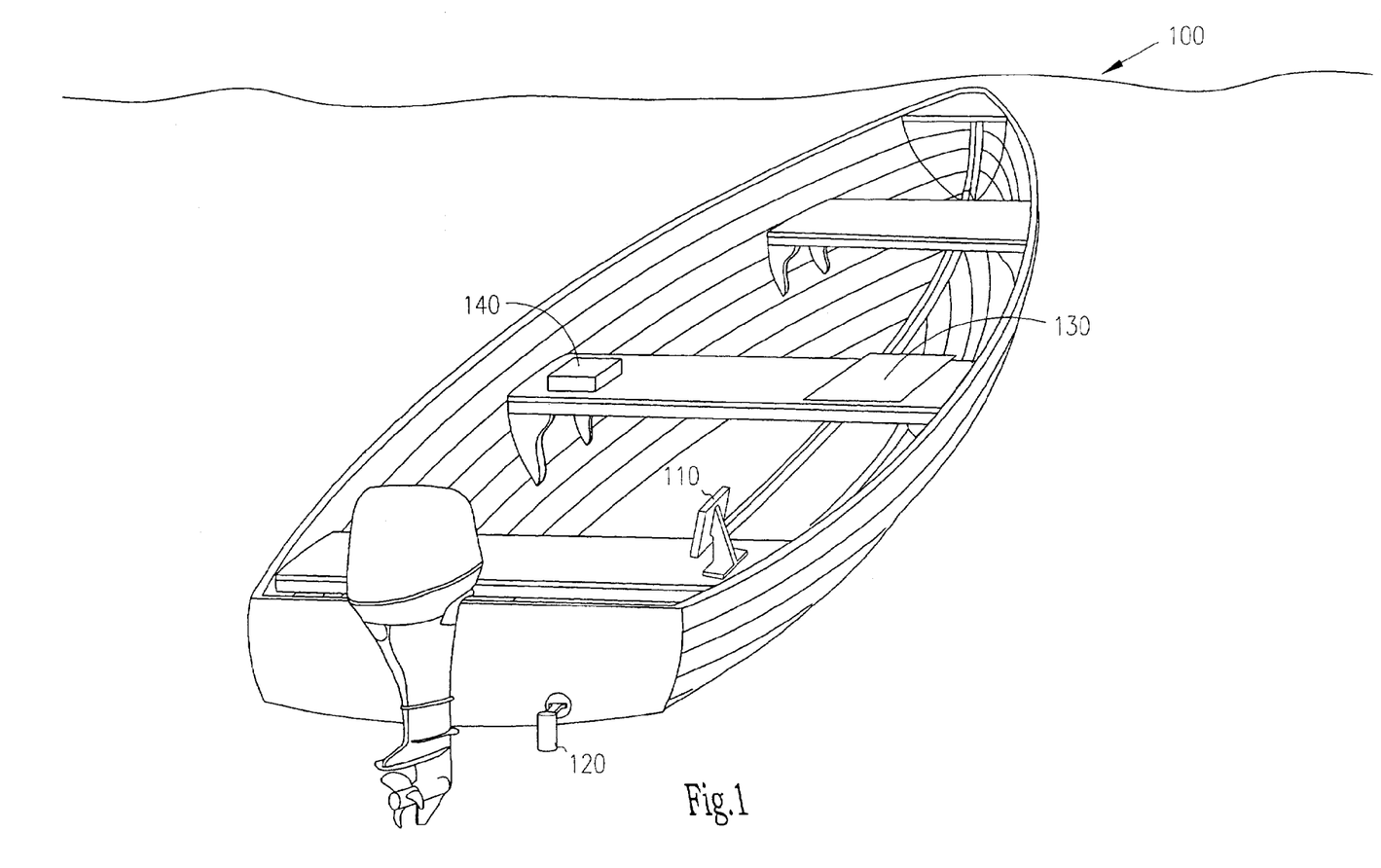
FIG. 1 illustrates an embodiment of a marine environment according to the teachings of the present invention.

FIG. 1 illustrates an embodiment of a marine environment according to the teachings of the present invention. In FIG. 1, a marine craft 100 is illustrated. Marine craft 100 can include any nature of marine craft whether powered by motor (inboard or outboard), sail or otherwise. In the marine environment of FIG. 1, the marine craft makes use of a marine system. That is, as shown in the embodiment of FIG. 1, the marine craft 100 includes a number of marine electronic devices, e.g. 110, 120, 130 and 140.

In the embodiment of FIG. 1, the marine system includes a first marine device 110, as discussed in more detail in connection with FIGS. 2A–2B. In one embodiment, the first marine device 110 includes a chartplotter. Examples of chartplotters include the GPSMAP 2010/2010C and the GPSMAP 2006/2006C as manufactured by Garmin International. Thus, the first marine device 110 can include a GPS capable marine device. In some embodiments, the first marine device includes a fishfinder such as the Fishfinder 240 Blue as manufactured by Garmin International. In some embodiments, the first marine device includes a unit having combined chartplotter and sounder capabilities such as provided in the GPSMAP 188/188C Sounder, manufactured by Garmin International.

In the embodiment of FIG. 1, the first marine device 110 is operably coupled to a second marine device 120. One of ordinary skill in the art will understand upon reading this disclosure the manner in which the second marine device can be operably coupled to the first marine device. In one embodiment, the second marine device 120 includes a source of temperature information such as a thermometer. In another embodiment, the second marine device 120 includes a transducer having a thermometer component; such as an electronic thermometer. Examples of transducers having temperature sensing capabilities include the transom mount transducer (part number 010-10171-00) manufactured by Garmin International. In the embodiment of FIG. 1, a third marine device 130 is illustrated. In one embodiment, the third marine device 130 is a sounder such as the GSD 20, manufactured by Garmin International. As noted above, the first marine device 110 can include combined chartplotting and sounding capabilities. One of ordinary skill in the art will appreciate the manner in which an external sounder, or third marine device 130, can be operably coupled with a transducer, or second marine device 120, and the first marine device, e.g. chartplotter and/or fishfinder.

As shown in the embodiment of FIG. 1, the marine system can further include a transceiver component 140, such as a marine craft radio, which is operable to wirelessly transmit and receive data, including the graphically presented data points discussed below, with a remote electronic device. As one of ordinary skill in the art will appreciate the remote electronic device can be located on land, air, or water.

Figure 2A:
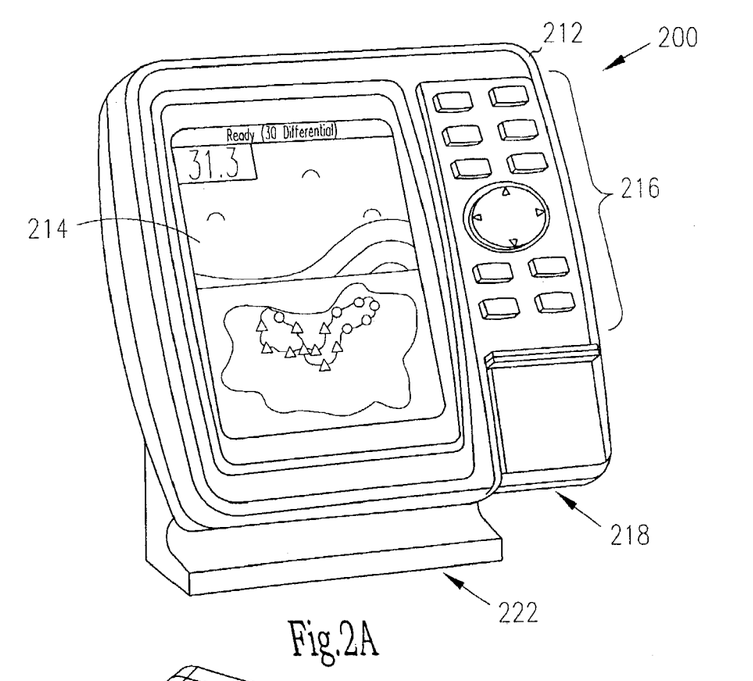
FIG. 2A illustrates a front perspective view of an embodiment of a marine device according to the teachings of the present invention.

FIG. 2A illustrates a front perspective view of an embodiment of a marine device 200 according to the teachings of the present invention. Marine device 200 can be used as the first marine device 110 shown in FIG. 1. As shown in the embodiment of FIG. 2A, the marine device 200 includes a protective housing 212 suitable to protect the device's internal electronics in a marine environment. As shown in FIG. 2A, the marine device 200 includes a display 214. In some embodiments, the display 214 is a monochrome/grayscale display. In other embodiments, the display 214 includes a color display. In the embodiment shown in FIG. 2A, the display 214 is illustrated having a split screen format, capable of simultaneously displaying a fishfinder or depth finder view and a chartplotter view. As further shown in FIG. 2A, the marine device 200 includes a number of input devices 216 such as data entry keys, function keys, softkeys, and the like. The embodiment of FIG. 2A also illustrates the marine device 200 including a data card slot, or data card port 218. The marine device 200 of FIG. 2A further includes a mounting bracket 222 so that the marine device 200 can be selectably mounted on a marine craft.

Figure 2B:
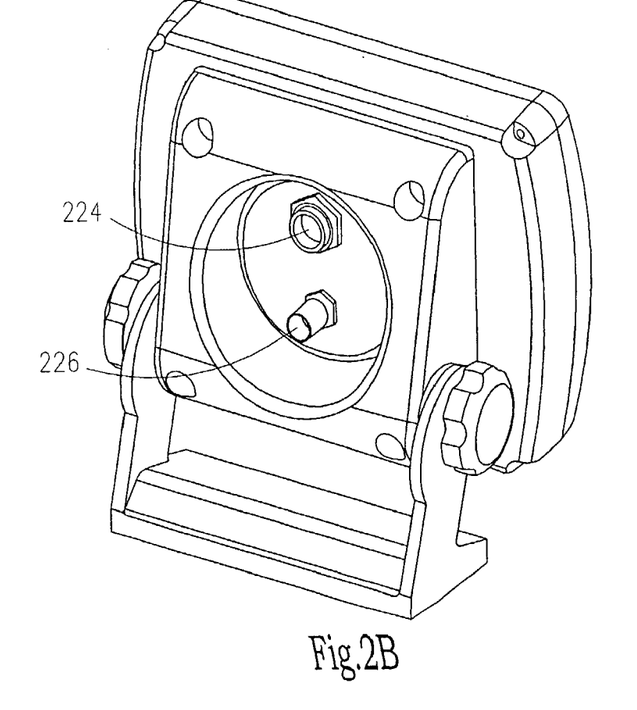
FIG. 2B illustrates a rear view of an embodiment of a marine device according to the teachings of the present invention.

FIG. 2B illustrates a rear view of an embodiment of a marine device 200 according to the teachings of the present invention. In the embodiment shown in FIG. 2B, a power/data cable port 224 is provided on the rear side of the marine device 200. Likewise, one or more additional data ports 226 are provided thereon. As one of ordinary skill in the art will appreciate the illustrations shown in FIGS. 2A and 2B are but one example of a hardware configuration for a marine device. Other configurations are considered within the scope of the present invention.

Figure 3A:
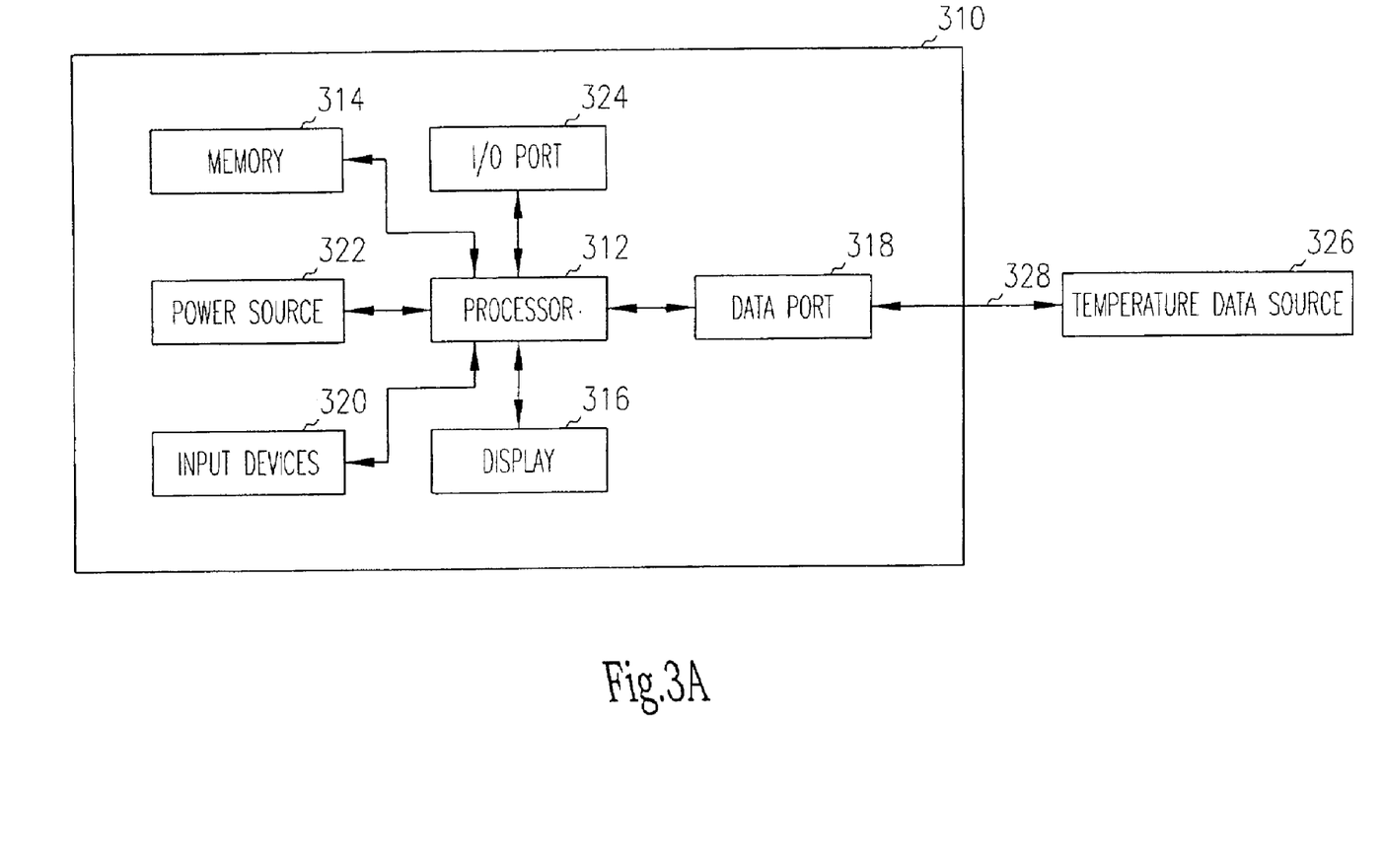
FIG. 3A is a block diagram of one embodiment for the electronic components associated with the present invention.

FIG. 3A is a block diagram of one embodiment for the electronic components associated with the present invention. The electronic components are discussed in connection with a marine device 310 as the same have been described herein. The invention, however, is not so limited. As shown in FIG. 3A, a marine device associated with the present invention can include a processor 312, a memory 314, a display 316, one or more data ports 318, input devices 320, and one or more I/O ports 324. As shown in FIG. 3A, and as one of ordinary skill in the art will appreciate, the above components can operably communicate with one another. In particular, the memory 314 can include computer executable instructions which can be operated on to provide the aspects of the present invention.

Additionally, as shown in the embodiment of FIG. 3A, the data port 318 is capable of receiving temperature data from a temperature data source 326 via a communications link 328. As one of ordinary skill in the art will understand upon reading this disclosure, the communications link can include any hardwired or wireless communications link 328. The invention is not so limited. For example, the information can be received from sources such as wired or wireless connections employing public or proprietary interfaces and/or protocols. In some embodiments, the temperature data source 326 includes a wired or wireless transmission of data signals such as signals conforming to the standards of the National Marine Electronics Association (NMEA). In some embodiments, the temperature data source 326 includes an electronic thermometer component integrated into a housing having a transducer also provided therein. In this embodiment, a hardwired communications link 328 can connect the electronic thermometer containing transducer to the data port 318. Further, in some embodiments, one or more temperature data sources 326 can be lowered to a desired depth wherein the temperature is measured by the source 326. The temperature data sources 326 can then transmit data to the device 311 through, for example, a long conductive cable, wirelessly, or by any other mechanism known in the art. These temperature data sources 326 can then provide temperature data at one or more depths below the surface.

Figure 3B:
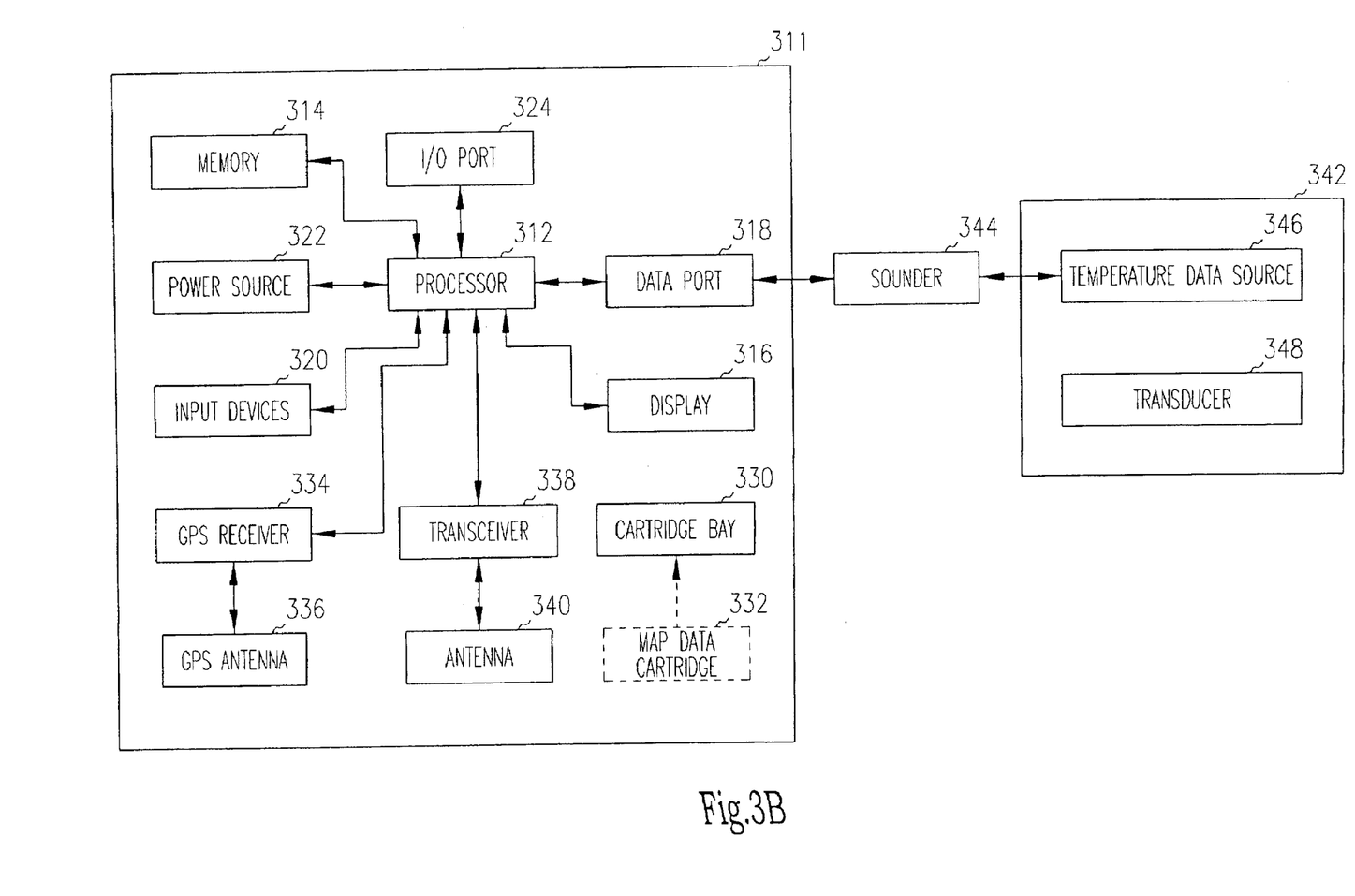
FIG. 3B is a block diagram of another embodiment for the electronic components associated with the present invention.

FIG. 3B is a block diagram of another embodiment for the electronic components associated with the present invention. In this embodiment, as with the embodiment of FIG. 3A, the data port 318 is capable of receiving temperature data from a temperature data source 326 via a communications link 328 and the communications link can include any hardwired or wireless communications link 328. However, in this embodiment the processor 312, memory 314, display 316, data port 318, input devices 320, power source 322, and I/O port 324 are provided in a first device 311 that is also equipped with a cartridge bay 330 allowing for the use of a map data cartridge 332, includes a GPS receiver 334 and GPS antenna 336, and includes a transceiver 338 and antenna 340 for sending and receiving data.

In this embodiment, cartridge bay 330 and map data cartridge 332 allow the device 311 to utilize data stored on an external cartridge 332, such as specific information about a body of water not contained within the memory 314 of the device 311. Additionally, with this embodiment, data can be downloaded from a remote location through use of the transceiver 338 and antenna 340. Those of skill in the art will realize that any method of transmission through a transceiver and antenna can be utilized to transfer data from a remote location. The GPS receiver 334 and antenna 336 allow the device 311 to track its location and enable the device 311 to integrate the tracking data received by the GPS components into the temperature data received from the temperature data source 346.

In some embodiments, a sounder 344 can be utilized to provide sounding capabilities to the first device 311. For example, sounding capabilities are not necessary for plotting and, therefore, in some chart plotting devices these capabilities have been left out of the plotting device. A sounder unit 344 can contain the necessary hardware and software to make the first device 344 operable to do depth sounding and/or fish finding. If such a unit 344 is necessary, it is typically coupled between the first device 311 and a second device 342 that houses the transducer 348 for producing and receiving the signals for measuring depth and identifying underwater structure. In some embodiments, the second device 342, can house both a temperature data source 346 and the transducer 348 and the temperature data source 346 is operable to communicate with the first device 311 through the sounder 344. Those skilled in the art will understand from reading this specification and using the present invention that the temperature data source 346 can alternatively be connected directly to the first device 311 while the transducer 348 is connected through the sounder 344 to the first device 311.

Embodiments of the present invention include software, application modules, and computer executable instructions operable on the devices and systems described herein. The embodiments, however, are not limited to any particular operating environment. Nor is the software limited to software written in a particular programming language. Thus, the invention includes a set of instructions executable by an information handling system to produce the embodiments described herein.

FIGS. 4A–4D illustrate display view presentations, such as can be provided on the display of a marine device, for several temperature log embodiments associated with the present invention. Throughout the several display embodiments of FIGS. 4A–4D, the x-axis of the display screen represents time and the y-axis of the display screen represents water temperature.

According to the teachings of the present invention, one or more water temperature thresholds, or threshold temperatures, can be selected. The selected temperature thresholds can serve to trigger temperature alarms. For example, on a marine device, a user can enter and select one or more water temperature thresholds using the data input devices, e.g. data entry keys, soft keys, function keys and the like, as illustrated and described in connection with FIGS. 2A–3B. One of ordinary skill in the art will further appreciate that the one or more threshold temperature values can be chosen remotely and transmitted in either a wireless or hardwired fashion to the memory of a marine device. Likewise, the one or more threshold temperature values can be user selected on a portable electronic device, such as a laptop computer, a PDA or the like, and then downloaded, or stored, to a data card. As described herein, such a data card can be inserted into a data slot or port and data can be uploaded to the memory of a marine device. Once selected, a user-set value for the one or more water temperature thresholds can be provided to the display of a marine device.

Further applicable to all the embodiments described herein, water temperature data is received. The water temperature data can be received from any source, such as the temperature data sources described herein. The software described above is operable on the one or more water temperature thresholds and the received water temperature data to provide a graphical presentation of the water temperature data in correlation to the one or more water temperature thresholds. As illustrated in the embodiments of FIGS. 4A–4D, the manner in which such a correlation is provided to the display of a marine device is further selectable, or user-definable. That is, the correlation can be presented based on one or more chosen formats or according to a selectable set of criteria. In this manner, the present invention graphically integrates temperature logs with temperature alarm.

Figure 4A:
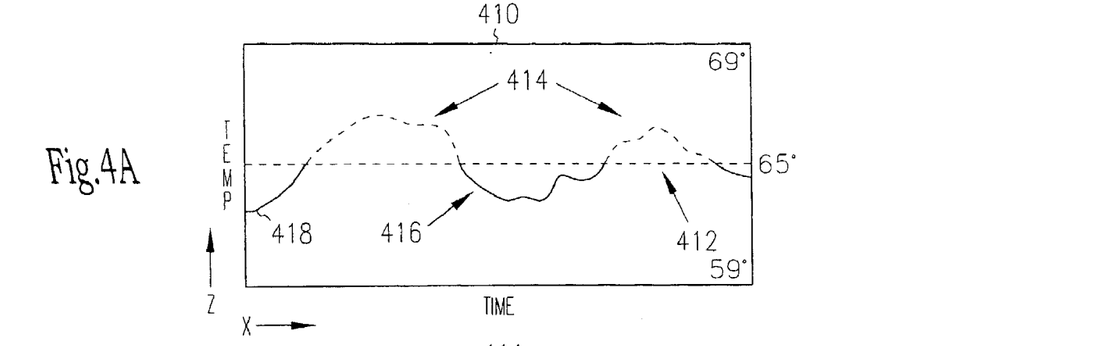
FIGS. 4A–4D illustrate display view presentations for several embodiments associated with the present invention.

FIG. 4A is one embodiment for a first user-chosen format or one selected criteria. As shown in the embodiment of FIG. 4A, a temperature threshold value has been established and is provided as a horizontal line 412 across the screen 410 at the appropriate position on the vertical temperature scale. In the temperature log embodiment of FIG. 4A, received water temperature data is graphically presented over time as represented by a scrolling line 418. As shown in the embodiment of FIG. 4A, the manner in which the received water temperature data 418 is presented is graphically differentiated to indicate when the water temperature data has crossed a selected water temperature threshold. That is, the received water temperature data 418 is displayed in a first format when the water temperature data is in a first relation to the threshold temperature 412 and is displayed in a second format when the water temperature data 418 is in a second relation to the threshold temperature 412.

In the embodiment shown in FIG. 4A, the water temperature data 418 is shown as a broken line 414 when the received water temperature data 418 is above a selected, established, or user-set value temperature threshold 412. And, the water temperature data 418 is represented as a solid line 416 when the received water temperature data 418 is below a selected, established, or user-set value temperature threshold 412. This representation facilitates a readily understandable, user-friendly, visual correlation of the graphical temperature log to the selected temperature threshold, or chosen temperature alarm setting. That is, the graphical representation of the temperature alarm is provided on the temperature log graph. In this manner, a user can easily view water temperature history and trend information in a graphical fashion.

As mentioned above, the correlation of water temperature data to water temperature alarm settings can be presented based on one or more chosen formats or according to a selectable set of criteria. FIG. 4A illustrates a first criteria embodiment. In this embodiment, a user has defined an active alarm state as occurring when the received water temperature data 418 rises above a selected water temperature threshold 412. In this embodiment, the broken line presentation 414 is being used to signify the active alarm state.

Figure 4B:
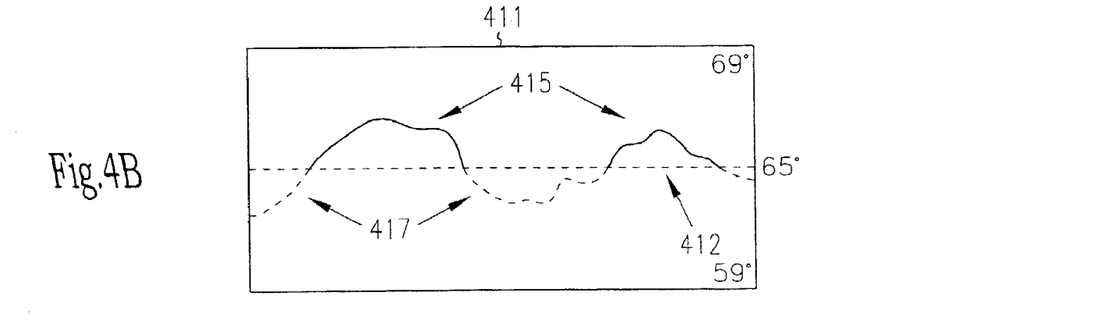

FIG. 4B illustrates an embodiment in which the graphically presented temperature alarm is in an active state according to a second criteria. In the embodiment of FIG. 4B, the received water temperature data is again shown as 418 and a selected water temperature threshold shown as 412. In the embodiment of FIG. 4B, a user has defined an active alarm state as occurring when the received water temperature data 418 drops below the selected water temperature threshold 412. In the embodiment of FIG. 4B, the received water temperature data 418 is shown as a solid line 415 when the water temperature data 418 is above a selected water temperature threshold 412. The received water temperature data 418 is shown as a broken line 417 when the water temperature data 418 is below the selected water temperature threshold 412. Thus, in the second criteria embodiment of FIG. 4B, a broken line presentation is again being used to signify the active alarm state.

Any number of various line types can used to signify different conditions. Hence, a user could variably elect to use a solid line to signify the active alarm state and a broken line to signify an in-active alarm state. Further, any number of temperature thresholds can be selected in the invention. Thus, in a monochrome/grayscale display a number of various line types, e.g. solid, dotted, thick, thin, long-hashed, short-hashed, and the like, can be used to graphically illustrate transitions of the water temperature data across the selected number of water temperature thresholds, or alarm settings.

In color displays, a number of different line colors can be used to graphically illustrate transitions of the water temperature data across a selected number of water temperature thresholds. For example, in the embodiment of FIG. 4A, a color display would present the received water temperature data in a first color when the water temperature data is below a given temperature threshold and would present the water temperature data in a second color when the water temperature data is above a given temperature threshold.

Figure 4C:
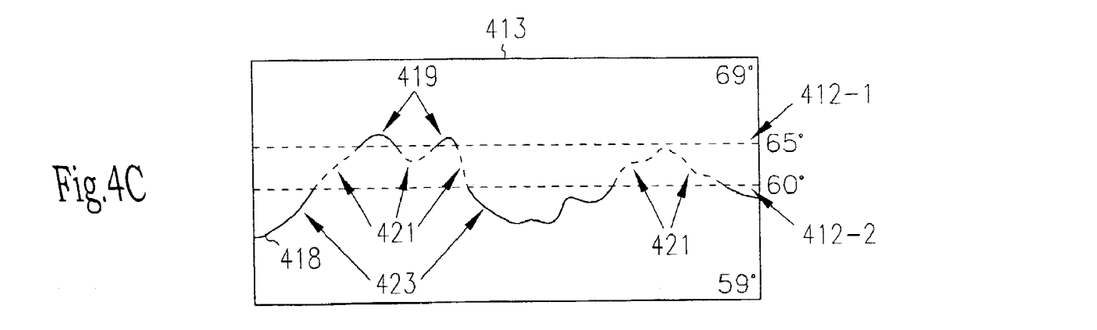

FIG. 4C illustrates an embodiment in which at least two water temperature thresholds have been selected. The at least two water temperature thresholds include an upper temperature threshold 412-1 and a lower temperature threshold 412-2. Again, the received water temperature data is shown as 418. FIG. 4C illustrates an embodiment in which the graphically presented temperature alarm is in an active state according to a third, selectable criteria. In the embodiment of FIG. 4C, a user has defined an active alarm state as occurring when the received water temperature data 418 is between the upper temperature threshold 412-1 and the lower temperature threshold 412-2. In the embodiment of FIG. 4B, the received water temperature data 418 is shown as a solid line 419 when the water temperature data 418 is above the upper temperature threshold 412-1. The received water temperature data 418 is shown as a broken line 421 when the received water temperature data 418 is between the upper temperature threshold 412-1 and the lower temperature threshold 412-2. And, the received water temperature data 418 is again shown as a solid line 423 when the water temperature data 418 is below the lower temperature threshold 412-2. Any number of various line types or colors, dependant on a monochrome/grayscale or color display capability, can be used to graphically differentiate, or distinguish, when the received water temperature data crosses one or more selected, established, or user-set water temperature threshold. Thus, in the third criteria embodiment of FIG. 4C, a broken line presentation is being used to signify the active alarm state and a solid line is being used to illustrate an in-active temperature alarm state, above the upper temperature threshold 412-1 or below the lower temperature threshold 412-2.

Figure 4D:
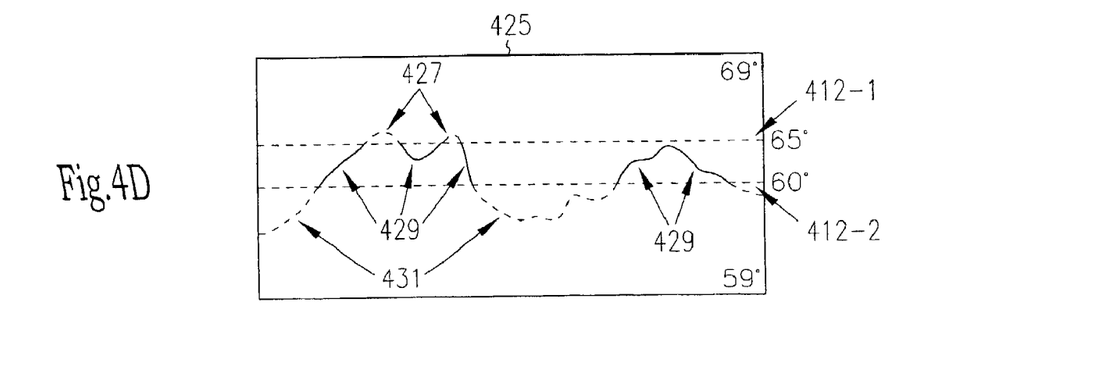

FIG. 4D illustrates an embodiment in which at least two water temperature thresholds have been selected. In FIG. 4D, the at least two water temperature thresholds include an upper temperature threshold 412-1 and a lower temperature threshold 412-2. Again, the received water temperature data is shown as 418.

However, FIG. 4D illustrates an embodiment in which the graphically presented temperature alarm is in an active state according to a fourth, selectable criteria. In the embodiment of FIG. 4D, a user has defined an active alarm state as occurring when the received water temperature data 418 is above the upper temperature threshold 412-1 and/or below the lower temperature threshold 412-2. In the embodiment of FIG. 4D, the received water temperature data 418 is shown as a broken line 427 when the water temperature data 418 above the upper temperature threshold 412-1. The received water temperature data 418 is shown as a solid line 429 when the received water temperature data 418 is between the upper temperature threshold 412-1 and the lower temperature threshold 412-2. And, the received water temperature data 418 is again shown as a broken line 431 when the water temperature data 418 is below the lower temperature threshold 412-2. Thus, in the fourth criteria embodiment of FIG. 4D, a broken line presentation is being used to signify the active alarm state, above the upper temperature threshold 412-1 or below the lower temperature threshold 412-2, and a solid line is being used to illustrate an in-active temperature alarm state, between the upper temperature threshold 412-1 and the lower temperature threshold 412-2. Again, any number of various line types or colors, dependant on a monochrome/grayscale or color display capability, can be used to graphically differentiate, or distinguish, when the received water temperature data crosses one or more selected, established, or user-set water temperature threshold.

Figure 5A:
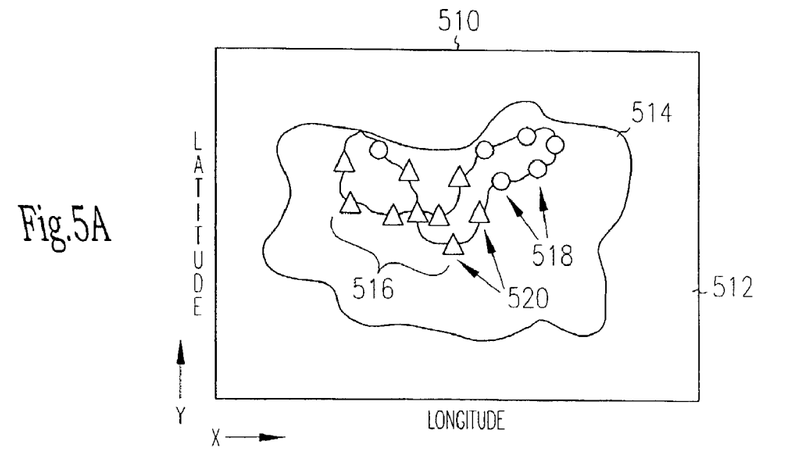
FIGS. 5A–5C illustrate another series of display view presentations for several embodiments associated with the present invention.
Figure 5B:
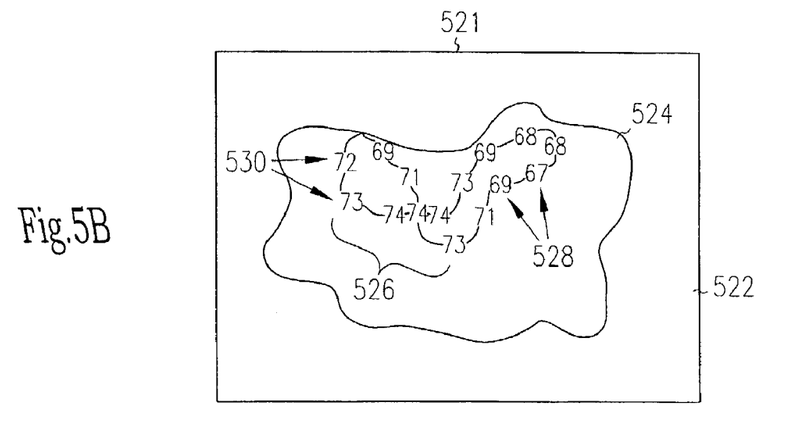
Figure 5C:
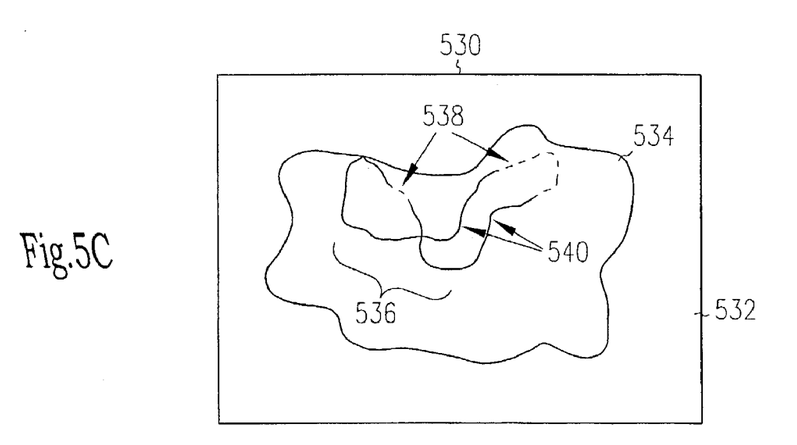

FIGS. 5A–5C illustrate a series of display view presentations, such as can be provided on the display of a marine device, for several track log embodiments associated with the present invention. Throughout the several display embodiments of FIGS. 5A–5C, the x-axis of the display screen represents longitude coordinate data and the y-axis of the display screen represents latitude coordinate data. That is, each display illustrates cartographic data. The display embodiments of FIGS. 5A–5C illustrate a land mass 512 and a body of water 514. A track log, 516, 526, and 536 respectively, is displayed on the body of water 514 representing the movement of a marine device on the body of water 514. A number or string of data points make up the track log 516. One of ordinary skill in the art will appreciate the manner in which a GPS, or other location enabled, marine device can record, or register the location of the marine device at various, user selectable time intervals. One of ordinary skill in the art will also understand upon reading this disclosure, the manner in which the x–y axes can change according to a user selectable configuration such as a track-up navigation display configuration and/or a North-up navigation display configuration. The invention is not so limited.

As before, one or more water temperature thresholds, or threshold temperatures, can be selected by a user of the marine device. The selected temperature thresholds will serve as temperature alarms. And, as before, water temperature data is received by the marine device from any suitable source, such as the temperature data sources described herein. The software described herein is operable on the one or more water temperature thresholds and the received water temperature data to provide a graphical presentation of the water temperature data in correlation to the one more water temperature thresholds. However, as illustrated in the embodiments of FIGS. 5A–5C, the correlation is graphically presented in connection with a track log of the marine device. In the several embodiments of FIGS. 5A–5C, the manner in which such a correlation is provided to the display of a marine device is further selectable, or user-definable. That is, the correlation can be presented based on one or more chosen formats or according to a selectable set of criteria. In this manner, the present invention graphically integrates marine device track logs with temperature logs and temperature alarms.

FIG. 5A is one embodiment for a first user-chosen format, selected criteria, or presentation format for integrating the manner in which the track log data points are displayed in correlation to temperature alarms. In the embodiment of FIG. 5A, at least one temperature threshold value has been established and water temperature data has been received. As one of ordinary skill in the art will appreciate upon reading this disclosure, each recorded track log data point can contain associated water temperature data/information received, measured, or detected at that location. As shown in the embodiment of FIG. 5A, the manner in which the track log data 516 is presented is graphically differentiated to indicate when the received water temperature data has crossed a selected water temperature threshold. That is, the track log data 516 is displayed in a first format 518 when the received water temperature data for a given location is in a first relation to the threshold temperature and the track log data 516 is displayed in a second format 520 when the received water temperature data for a given location is in a second relation to the threshold temperature.

In the embodiment shown in FIG. 5A, a given track log data point is shown on the track log 516 as a circle 518 when the received water temperature data associated with that track log data point is above a selected, established, or user-set value temperature threshold 412. And, a given track log data point is represented as a triangle 520 when the received water temperature data associated with the track log data point is below a selected, established, or user-set value temperature threshold. This representation facilitates a readily understandable, user-friendly, visual correlation of the graphical track log to the selected temperature threshold, or chosen temperature alarm setting. That is, the temperature alarm information or state is provided graphically on a track log over cartographic data. As one of ordinary skill in the art will appreciate upon reading this disclosure any number of symbols, graphical shapes, colors and the like can be used to differentiate, or distinguish, a relationship between a given track log data point and received water temperature data associated with the given track log data point. Certain symbols, graphical shapes, colors and so forth are thus used to differentiate active versus in-active temperature alarm states.

FIG. 5B illustrates another embodiment for a second user-chosen format, selected criteria, or presentation format for integrating the manner in which track log data points are displayed in correlation to a temperature log and temperature alarms. As before, each recorded track log data point can contain associated water temperature data/information received, measured, or detected at that location. In the embodiment of FIG. 5B, the number of track log data points 526 are displayed in a numerical fashion with the numeral being a representation of the measured, received, or detected water temperature data at each track log data point. In the embodiment of FIG. 5B, the numeric representation of the measured, received, or detected water temperature data, presented at each track log data point, can be differentiated by color, font, or the like to distinguish the relationship between the received water temperature data and a water temperature threshold at a given track log data point. In this manner, a readily understandable, user-friendly, visual correlation of the graphical track log to the selected temperature threshold, or chosen temperature alarm setting is provided. That is, a user can speedily surmise the track log locations where the water temperature rises above or drops below a desired temperature, e.g. selected water temperature threshold. And, a user can quickly ascertain, or differentiate, between active and in-active temperature alarm states.

As before, any number of temperature thresholds can be selected in the invention. For example, in a color display a number of various colors can be used to graphically illustrate transitions of the water temperature data across the selected number of water temperature thresholds, or alarm settings, at different track log data point locations. For example, in one embodiment of FIG. 5B, the numeric temperature representation of the measured, received, or detected water temperature data at track log data points 528 can be provided in a first color indicating that the associated water temperature at those track log data points 528 is below a selected water temperature threshold. And, the numeric temperature representation of the measured, received, or detected water temperature data at track log data points 530 can be provided in a second color indicating that the associated water temperature at those track log data points 530 is above a selected water temperature threshold. In addition, the embodiment of FIG. 5B, allows a user to view water temperature history and trend information in a graphical fashion for specific locations on a body of water.

FIG. 5C illustrates another embodiment for a third user-chosen format, selected criteria, or presentation format for integrating the manner in which track log data points are displayed in correlation to temperature alarms. As before, at least one temperature threshold value has been established and water temperature data has been received. And, as before, each recorded track log data point can contain associated water temperature data/information received, measured, or detected at that location. As shown in the embodiment of FIG. 5C, the manner in which the track log data 536 is presented is graphically differentiated to indicate when the received water temperature data has crossed a selected water temperature threshold. That is, the track log data 536 is displayed in a first format 538 when the received water temperature data for a given location is in a first relation to the threshold temperature and the track log data 536 is displayed in a second format 540 when the received water temperature data for a given location is in a second relation to the threshold temperature.

The correlation of water temperature data to water temperature alarm settings can be presented based on one or more chosen formats or according to a selectable set of criteria. FIG. 5C illustrates a one of many criteria embodiments. For example, in the embodiment of FIG. 5C, a user can define an active alarm state as occurring when the received water temperature data 438 rises above a selected water temperature threshold. In this embodiment, the broken line presentation 438 is being used to signify the active alarm state. Alternatively, a user can define an active alarm state as occurring when the received water temperature data 540 falls below a selected water temperature threshold. In this embodiment, the solid line presentation 540 is being used to signify the active alarm state.

Thus, any number of various line types can used to signify different conditions. And, as before, any number of temperature thresholds can be selected in the invention. Thus, in a monochrome/grayscale display a number of various line types, e.g. solid, dotted, thick, thin, long-hashed, short-hashed, and the like, can be used to graphically illustrate transitions of the water temperature data across the selected number of water temperature thresholds, or alarm settings, at given track log data points.

In color displays, a number of different line colors can be used to graphically illustrate transitions of the water temperature data across a selected number of water temperature thresholds for given track log points. Thus, in one embodiment of FIG. 5C, a color display would present the track log data in a first color when the water temperature data associated with a given track log data point is below a given temperature threshold and would present the track log data in a second color when the water temperature data associated with the track log data point is above a given temperature threshold.

Thus, a readily discernable, visual correlation between a graphical track log and a selected temperature threshold, or chosen temperature alarm setting is provided. A user can speedily surmise the track log locations where the water temperature rises above or drops below a desired temperature, e.g. selected water temperature threshold. And, a user can quickly ascertain, or differentiate, between active and in-active temperature alarm states.

CONCLUSION

Although specific embodiments have been illustrated and described herein, it will be appreciated by those of ordinary skill in the art that any arrangement which is calculated to achieve the same purpose can be substituted for the specific embodiments shown. This application is intended to cover any adaptations or variations of the present invention. It is to be understood that the above description is intended to be illustrative, and not restrictive. Combinations of the above embodiments, and other embodiments will be apparent to those of skill in the art upon reviewing the above description. The scope of the invention includes any other applications in which the above systems, devices, and methods are used. The scope of the invention should be determined with reference to the appended claims, along with the full scope of equivalents to which such claims are entitled.

What is claimed is:

1. A method for monitoring water temperature, comprising:
   receiving water temperature data;
   graphically presenting the water temperature wherein the water temperature data is graphically differentiated to indicate when the water temperature data crosses a threshold temperature, wherein graphically presenting the water temperature data includes displaying a scrolling line including data points, wherein each data point in the scrolling line represents a temperature sample; and
   displaying the scrolling line in a first format when the water temperature is in a first relation to the threshold temperature and displaying the scrolling line in a second format when the water temperature is in a second relation to the threshold temperature.

2. The method of claim 1, wherein receiving water temperature data includes receiving water temperature data from a source selected from the group of a transducer equipped with an electronic thermometer and a transmission of data signals conforming to the standards of the National Marine Electronics Association (NMEA).

3. The method of claim 1, wherein the method further includes recording the water temperature data and displaying a water temperature history.

4. The method of claim 1, wherein the first format includes a solid line format and wherein the second format includes a broken line format.

5. A method for graphically presenting a water temperature log, comprising:
   setting one or more temperature thresholds;

recording a water temperature over time;
displaying a string of data points, wherein each data point includes information on the recorded water temperature at a particular time; and
graphically presenting a correlation between the one or more temperature thresholds and the recorded water temperature by altering a display format for the string of data points.

6. The method of claim 5, wherein setting one or more temperature thresholds includes setting an upper temperature threshold.

7. The method of claim 5, wherein setting one or more temperature thresholds includes setting a lower temperature threshold.

8. The method of claim 5, wherein setting one or more temperature thresholds includes setting both an upper and a lower temperature threshold.

9. The method of claim 5, wherein displaying a string of data points includes displaying a string of data points which represent a track log.

10. A computer readable medium having a set of computer readable instructions, the set of computer readable instructions comprising instructions for:
defining one or more temperature thresholds;
maintaining a track log;
recording a water temperature over time;
displaying a correlation between the one or more defined temperature thresholds and the recorded water temperature by altering a display format of the track log when the recorded water temperature crosses one or more of the defined temperature thresholds.

11. The computer readable medium of claim 10, wherein recording the water temperature over time includes recording the water temperature over time and location.

12. The computer readable medium of claim 11, wherein the method further includes displaying the track log having a number of location data points, wherein displaying the track log includes displaying the water temperature recorded at each of the location data points.

13. The computer readable medium of claim 12, wherein displaying a correlation between the one or more defined temperature thresholds and the recorded water temperature includes altering the display format of the track log when the recorded water temperature crosses one or more of the defined temperature thresholds.

14. A marine device, comprising:
a processor;
a memory coupled to the processor, wherein the memory is operable to store one or more water temperature thresholds;
at least one input capable of receiving water temperature input data; and
a display operable to graphically present a number of data points along a track, each data point having an associated water temperature, wherein the number of data points graphically differentiate when the associated water temperature crosses the one or more water temperature thresholds by altering a display format for the data points.

15. The marine device of claim 14, wherein the display is a color display which graphically presents the number of data points in a number of colors, wherein a given color represents a certain correlation to the one or more water temperature thresholds according to a selectable set of criteria.

16. The marine device of claim 15, wherein a first color is used to graphically differentiate when the water temperature associated with a data point is below a water temperature threshold and a second color is used to graphically differentiate when the water temperature associated with a data point is above the water temperature threshold.

17. The marine device of claim 16, wherein in a second criteria a water temperature alarm is in an active state when the water temperature associated with a data point is below a water temperature threshold, and wherein the first color is chosen to visually signify the active state of the water temperature alarm.

18. The marine device of claim 16, wherein in a first criteria a water temperature alarm is in an active state when the water temperature associated with a data point is above a water temperature threshold, and wherein the second color is chosen to visually signify the active state of the water temperature alarm.

19. The marine device of claim 15, wherein in a third criteria at least two water temperature thresholds are defined, wherein the at least two water temperature thresholds include an upper temperature threshold and a lower temperature threshold.

20. The marine device of claim 19, wherein a first color is used to graphically differentiate when the water temperature associated with a data point is above the upper temperature threshold, and wherein a second color is used to graphically differentiate when the water temperature associated with a data point is between the upper temperature threshold and the lower temperature threshold.

21. The marine device of claim 20, wherein a third color is used to graphically differentiate when the water temperature associated with a data point is below the lower temperature threshold.

22. The marine device of claim 19, wherein a water temperature alarm is in a non-active state when the water temperature associated with a data point is between the upper temperature threshold and the lower temperature threshold.

23. A marine system, comprising:
a first marine device, the first marine device including;
a processor;
a memory coupled to the processor, wherein the memory is operable to store one or more water temperature thresholds;
at least one input capable of receiving water temperature input data; and
a display operable to graphically present a number of data points along a track, each data point having an associated water temperature, wherein the number of data points graphically differentiate when the associated water temperature crosses the one or more water temperature thresholds by altering a display format for the data points; and
a second marine device operably coupled with the first marine device, the second marine device having a thermometer component.

24. The marine system of claim 23, wherein the first marine device includes a chartplotter.

25. The marine system of claim 23, wherein the marine system further includes a sounder operably coupled with the first and the second marine devices such that the marine system is sonar capable.

26. The marine system of claim 23, wherein the second marine device includes a transducer.

27. The marine system of claim 23, wherein the system further includes at least one transceiver component operable to wirelessly transmit and receive data, including the graphically presented number of data points, with a remote electronic device.

28. The marine system of claim 23, wherein the number of data points include water temperature log data points.

29. The marine system of claim 28, wherein water temperature log data points present water temperature history and trend information in a graphical fashion.

30. The marine system of claim 28, wherein the water temperature log data points include water temperature data log points for a number of selected depths.

31. The marine system of claim 23, wherein the first marine device includes a GPS capable device.

32. The marine system of claim 23, wherein the number of data points include track log data points.

33. A method for monitoring water temperature, comprising:
receiving water temperature data; and
graphically presenting the water temperature as a scrolling line including data points, wherein each data point in the scrolling line represents a temperature sample, wherein the scrolling line is solid when the water temperature is in a first relation to a threshold temperature, and wherein the scrolling line is broken when the water temperature is in a second relation to the threshold temperature.

34. A method for monitoring water temperature, comprising:
receiving water temperature data; and
graphically presenting the water temperature as a scrolling line including data points, wherein each data point in the scrolling line represents a temperature sample, wherein the scrolling line is displayed in a first color when the water temperature is in a first relation to a threshold temperature, and wherein the scrolling line is displayed in a second color when the water temperature is in a second relation to the threshold temperature.

35. A method for monitoring water temperature, comprising:
receiving water temperature data; and
graphically presenting the water temperature as a plurality data points along a track, wherein each data point represents a temperature sample, wherein the data points are displayed in a position representative of a location of the corresponding temperature sample, wherein the data points are displayed in a first color when the water temperature is in a first relation to a threshold temperature, and wherein the data points are displayed in a second color when the water temperature is in a second relation to the threshold temperature.

36. A computer readable medium having a set of computer readable instructions, the set of computer readable instructions comprising instructions for:
defining one or more temperature thresholds;
maintaining a track log;
recording a water temperature over time and location relative to the track log;
displaying the track log; and
altering a display format of the track log when the recorded water temperature crosses one or more of the defined temperature thresholds.

37. A marine device, comprising:
a processor;
a memory coupled to the processor, wherein the memory is operable to store one or more water temperature thresholds;
at least one input capable of receiving water temperature data; and
a display operable to graphically present the water temperature as a scrolling line including data points, wherein each data point in the scrolling line represents a temperature sample, wherein the scrolling line is solid when the water temperature is in a first relation to a threshold temperature, and wherein the scrolling line is broken when the water temperature is in a second relation to the threshold temperate.

38. A marine device, comprising;
a processor;
a memory coupled to the processor, wherein the memory is operable to store one or more water temperature thresholds;
at least one input capable of receiving water temperature data; and
a display operable to graphically present the water temperature as a scrolling line including data points, wherein each data point in the scrolling line represents a temperature sample, wherein the scrolling line is displayed in a first color when the water temperature is in a first relation to a threshold temperature, and wherein the scrolling line is displayed in a second color when the water temperature is in a second relation to the threshold temperature.

39. A marine device, comprising:
a GPS receiver for receiving satellite signals from a plurality of satellites;
a processor coupled with the GPS receiver for calculating a location of the device as a function of the satellite signals;
a memory coupled to the processor, wherein the memory is operable to store one or more water temperature thresholds, and wherein the memory is operable to maintain a track log;
at least one input capable of receiving water temperature data; and
a display operable to display the track log having a number of location data points relating to the water temperature, and wherein the display format of the track log is altered when the recorded water temperature crosses one or more of the temperature thresholds.

40. A computer readable medium having a set of computer readable instructions, the set of computer readable instructions comprising instructions for defining one or more temperature thresholds;
maintaining a track log;
recording a water temperature relative to location of the track log;
displaying the track log; and
altering a display format of the track log when the recorded water temperature crosses one or more of the defined temperature thresholds.

* * * * *